(No Model.) 2 Sheets—Sheet 1.
J. W. ANDERSON.
MEAT AND VEGETABLE SLICING MACHINE.
No. 337,545. Patented Mar. 9, 1886.
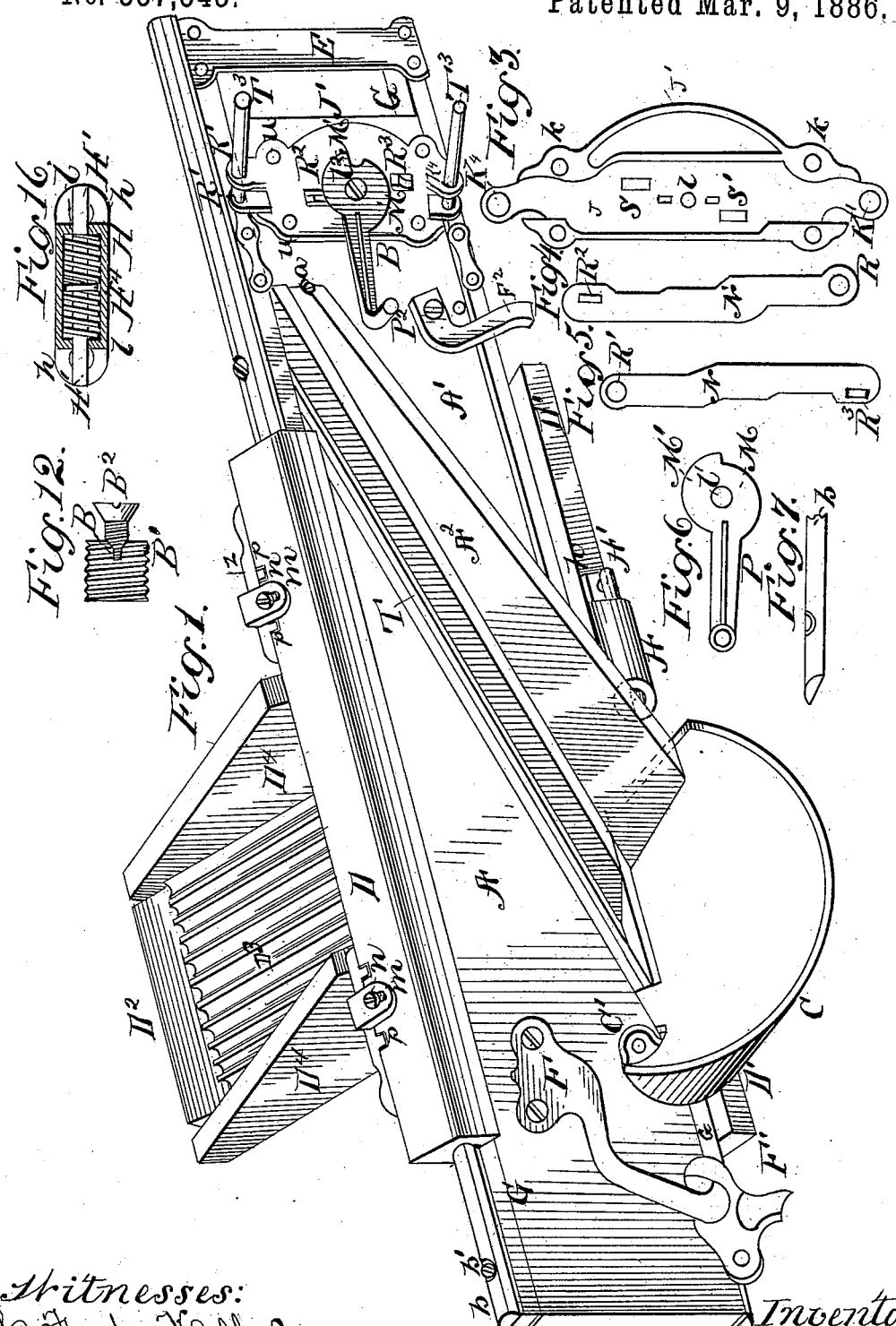
Witnesses:
C. Fred. Heller.
J. M. Weaver.
Inventor.
John W. Anderson.
By Theophilus Weaver
Attorney (No Model.) 2 Sheets—Sheet 2.
J. W. ANDERSON.
MEAT AND VEGETABLE SLICING MACHINE.
No. 337,545. Patented Mar. 9, 1886.
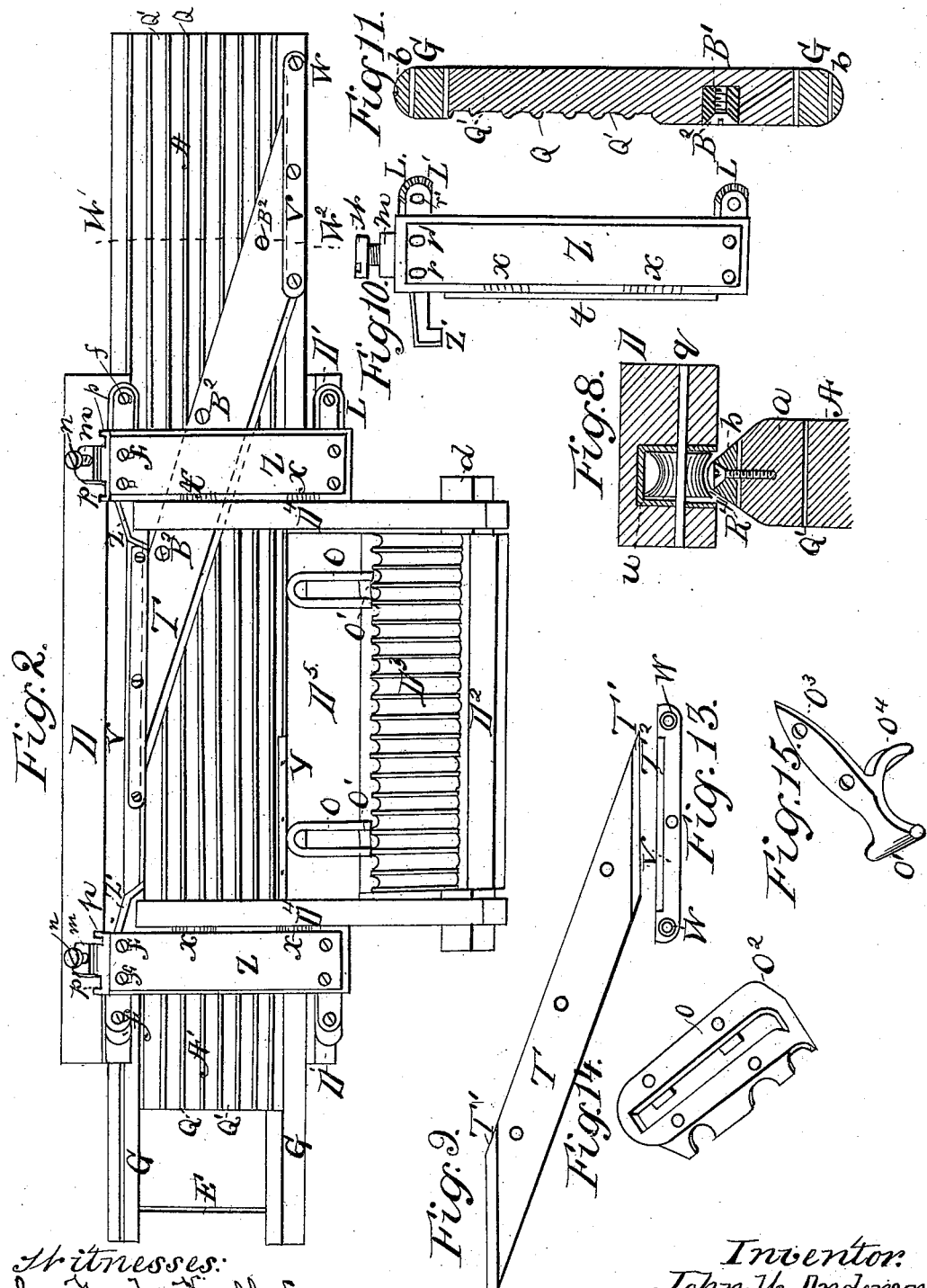
Witnesses:
Fred. Heller
J. M. Weaver
Inventor:
John W. Anderson
By Theophilus Weaver
Atty

United States Patent Office.

JOHN W. ANDERSON, OF LANCASTER, PENNSYLVANIA.

MEAT AND VEGETABLE SLICING MACHINE.

SPECIFICATION forming part of Letters Patent No. 337,545, dated March 9, 1886.

Application filed April 13, 1885. Serial No. 162,049. (No model.)

*To all whom it may concern:*

Be it known that I, JOHN W. ANDERSON, a citizen of the United States, residing at Lancaster, in the county of Lancaster and State of Pennsylvania, have invented certain new and useful Improvements in Meat and Vegetable Slicing Machines; and I do hereby declare that the following is a full, clear, and exact description of the invention, which will enable others skilled in the art to which it appertains to make and use the same.

My present invention is an improvement on the device described in my patent of October 24, 1882, and numbered 266,263. My said meat and vegetable slicing machine was not as perfect as found desirable in practice, and the several points of further improvement and novelty are, in brief, spring-stops for limiting the stroke of the slide, rear guides for regulating movement of presser on feed, certain ledges on cross braces entered in transverse kerfs for stiffening machine-frame, certain fasteners for knife, a receiver on knife-operating slide for sliced articles, and an adjusting mechanism for regulating the set of gage-board, as hereinafter more fully described and claimed.

Said novel and useful features will be more fully described hereinafter and claimed, reference being had to the accompanying drawings, in which—

Figure 1 is a perspective view of my invention; Fig. 2, a front view of the same; Figs. 3, 4, 5, and 6, plans of base-plate of locking-cam, right and left friction-pawls, and the double eccentric-lever operating the same; Fig. 7, a view of liner for edge of slide; Fig. 8, a transverse section of slide with liner thereon, and guide therefor with roller therein; Fig. 9, a plan of the knife; Fig. 10, a front view of one of two corresponding cross-braces joining the guides of slide together; Fig. 11, a cross-section of the knife-slide, taken at the indicated line $W' W^2$, Fig. 2; Fig. 12, a side view of one of the embedded nuts or fillings at base of knife, with screw therein; Fig. 13, a rear view of one of the corresponding fasteners or end plates for securing knife; Fig. 14, a perspective view of the stationary part or bed-plate of one of the sliding hinges connecting the presser or leaf in feed-box; Fig. 15, a like view of the movable clip, and Fig. 16 a view of the spring-stop in its case.

Similar reference-letters denote similar parts throughout description and claims.

Letters A A' G denote the knife-slide, and D D' are the parallel guides therefor, which latter are firmly but adjustably connected together by the cross-braces Z Z, the feed-box $D^4 D^5$ being abutted against said guides between said braces. The slide is operated by the handle F thereon, and has a reciprocating movement between the guides. The length of stroke of the slide is limited by the projections $F' F^2$ thereon coming in contact with the spring-stop H' or plunger in casing H, which latter is secured to guide D' by screws, as at $h$. The casing has a tubular socket containing spiral springs $l$, as shown, and a collar, $H^4$, on the stop or plunger sets against said springs in the socket.

The object of limiting the stroke of the slide is to form a sort of closed box between the slide and the presser $D^3$, when the latter is raised and advanced toward the knife T, that small articles—as potatoes—when put into said box to be sliced, may not fall out behind the rear end of slide. Stop $F^2$ is a pivoted latch, which is raised for withdrawing slide. Said presser or leaf $D^3$ is also guided to come up squarely or parallel to the plane of the knife, as follows: The stationary or bed plates O of its sliding hinges, being slotted at right angles to said plane, and having their rear ends, $O^2$, turned down, as shown in Fig. 14, thus leaving the rear ends of said slots open in line of the top thereof, yet closed below, hold or keep the cross-heads $o'$ of the sliding clips $O' O^3$ of said hinges under the same, while the shanks at said cross-heads traverse said slots, that one of said shanks may not advance more rapidly than the other, and thus present the presser or leaf $D^3$, attached to the tail-pieces $O^3$ thereof, in canted position to the knife, said sliding parts or clips $O' O^3$ are provided with the rear extensions, $O^4$, adapted to traverse said slots in rear of the shanks at the cross-heads $O'$, and thus require both to be equally advanced to move freely in their paths. The extensions or guides $O^4$ pass out of said slots when the presser is fully retracted, and are out of the way to lay it down for a table-leaf or bottom of feed box D⁴ D⁵, as is done when a large article, as a loaf of bread, is being cut.

The knife T is made in rhomboidal form, having its ends T' beveled to take hold full breadth behind the fasteners or plates V, which are provided with the beveled seats T² to receive said ends, and are secured to the stringers G of the knife slide by wood-screws through them at W W. The knife has its back secured to the knife-board A' by screws B², driven into stationary embedded nuts or fillings B', as shown in Fig. 11. Said nuts or fillings are each threaded exteriorly and interiorly and slotted at B transversely, and are driven home firmly into the wood provided with suitable holes to receive them. Said fillings are used to fasten the knife solidly, and that the board may not be worn in attaching and detaching the same. The cross-braces Z are provided with basal ledges p, which bite into kerfs in the guides D D', for assisting their attaching-screws e f, and inner marginal ledges, t, bite in kerfs in the feed-box sides D⁴, for assisting the attaching-screws in lugs X on said braces. The object of said joints is to constitute a strong frame for guiding the knife-slide. For protecting the tapering tops of the sides D⁴ against splitting, the hook form extensions Z' on said braces hold in kerfs in said tops. The screws f g in oblong holes in the upper ends of said cross-braces Z join the latter adjustably to the guide D, to compensate for wear at the slide's bearings.

For certainly securing the parts united by said screws in adjusted position, the extensions m on said braces are provided with blunt-pointed set-screws n, adapted to set against the guide D, as shown. On the exit side of the knife-board is a receiver, C, a scoop or bowl form extension, secured by screws C' through lugs thereon to the board A and stringer G in position, as shown in Fig. 1. On the gage-board A' is secured thereto the chute or slant shield A², arranged along the lower edge of the exit from the knife and inclined thereto, that the sliced product may be caught on said chute and delivered at the return-stroke onto said receiver. Scattering over the table or beyond a vessel set to receive said product is thus avoided. When bread is sliced, the pieces pass out freely over the receiver and said chute. The gage-board A' is supported on the inclined parallel standards T³, as in my said former patent, but is differently clamped in adjusted position, that it may be rigidly held on both its edges by the said standards thereat to avoid warping the board, and that it may be quickly released and reset to slice thick or thin or medium divisions, as desired, at any moment by any one. The means for attaining these results are the locking-cam P, having eccentric faces M M' on its opposite edges, and being pivoted at l' by screw l² to the face of the bed-plate J' in a central position between the standards T³. Said plate is provided with eyes K' K⁴ in lateral extensions for embracing said standards oppositely loosely, and is secured by wood-screws to the board A'. The same is also provided with recess or ledge bounded retreat J on its under side, in which are inserted the right and left locking-bars N N', each having an eye, R' or R, adapted to embrace the standards T³ loosely close to the eyes of plate J'. The limbs of said pawls are arranged under said plate and pass each other to be on either side of the screw l². The inner ends of said limbs are provided with erect projections R² R³, respectively, which come through apertures s s' in said plate, in close proximity to the eccentric bearings M and M' of the locking cam turned to unlocked position. The parts of the said bed-plate and the parts of said pawls near said eyes therein are correspondingly up-edged to bring the eyes therein to squarely embrace said standards. When the lever or handle of the cam P is turned, the edges M M' thrust the lugs R² R³ more widely apart, and thereby the pawls N N' are drawn inward and the eyes thereof firmly grip the standards T³, which are braced in the opposite direction by the eyes of the plate J'. They are therefore clamped by said parts exerting a contrary grip in embracing them. When the handle of the cam is slacked, the gage-board A' can be freely moved out or in by hand, and the cross-brace E stops it to avoid disengaging it from its standards T³. When said board is set to gage the cut as desired, said cam is simply turned to interlock the parts, as described, and they stay taut.

The knife-board A and the gage-board A' have their front surface, or that facing the articles to be sliced, mainly plowed away by broad grooves Q', thus presenting only narrow ledges or ribs Q, running parallel with the guides D D', that the friction encountered by the slide may be reduced—that is, friction from contact with said articles. For a like reason the friction encountered by the edges or stringers G of slide in the guides D D', I sometimes reduce by the use of anti-friction rollers R⁴, grooved as shown, and by the use of oval metal liners b, attached to the edges of said stringers G, and adapted to ride only against said rollers, as shown in Fig. 8, which are incased in metallic walls u. I also employ a metallic ledge or throat-piece, Y, on the edge of the feed-box, where the knife encounters the most difficulty in making a clean cut in slicing dried beefsteak—namely, in finishing or cutting through the piece where stringy or tough portions would otherwise not be cleanly severed by the knife shearing along wood-work.

I am aware that much of my present invention is auxiliary to my said former invention for perfecting the same, and I do therefore not claim such, broadly; but other features are applicable to other slicing-machines as well, and I desire to claim such more broadly.

I claim—

1. In a meat and vegetable slicing machine, the combination, with the reciprocatory knife-slide having projections near each end, of a stationary guide therefor, having a spring-stop thereon midway of its length, whereby the throw or longitudinal movement of said slide is limited by contact of said projections with said spring-stops, substantially as described.

2. The combination, with the leaf $D^3$, provided with a couple of attaching-slips, $O'$ $O^3$, having on each a rear guide, $O^4$, of a couple of bed-plates, O, having their rear ends turned down, and having extensive longitudinal slots therein, in which said clips are caught by the cross-heads thereon, and in which they and said guides freely traverse, in manner to permit said leaf to lie back flat with the plane of the table, to which it is thereby permanently hinged, substantially as and for the purpose set forth.

3. In a meat and vegetable slicing machine, the stationary feed-box $D^4$ $D^5$, having its bottom or table provided with plates O, having therein extensive slots, and having their rear ends, $O^2$, turned down below the top of said table, in combination with the upward-folding presser-leaf $D^3$, provided with attaching-clips $O'$ $O^3$, having their shanks kept in said slots by the cross-heads $O'$ thereon caught in said slots, and with rear extensions or guides, $O^4$, on said clips projected to reach into said slots, and thereby regulate the advancement of said leaf squarely up to the knife-carrying slide, substantially as and for the purpose set forth.

4. In a machine, substantially as set forth, in combination with the knife secured to the knife-slide by bolts driven through it into embedded nuts, as set forth, beveled end ledges clamped on the correspondingly-beveled ends of the knife, parallel with and on the stringers on the edges of the slide, substantially as and for the purposes set forth.

5. In a meat and vegetable slicing machine, the combination, with the transverse braces Z, having their under surfaces provided with the ledges $p$ at their ends, of the parallel guides D D' for the knife-slide A A' G, having therein transverse parallel kerfs adapted to admit said ledges snugly therein, and thereby sustain said guides squarely braced, when said guides and braces are secured together by wood-screws, as set forth.

6. The combination, with the cross-braces Z, provided with oblong screw-holes $r$ $r'$, through which screws $f$ connect them adjustably to the guide D, of extensions $m$ on the top of said braces, provided with the set-screws $n$, adapted to set against the top of guide D and assist screws $f$, substantially as and for the purpose set forth.

7. In a meat and vegetable slicing machine, the combination of a reciprocatory slide provided with a knife arranged to shear close up to the throat of the feed-box and having V-shaped or oval edges, two parallel guides having journaled in their inner edges anti-friction rollers whose peripheries are grooved to correspond with said slide's edges, and at such distance apart as to embrace said edges snugly between the opposite rollers for relieving the upward action of said slide while the knife performs its drawn cuts, and metallic liners for said rollers in said guides for keeping said knife in shearing contact with the throat of the feed-box, substantially as shown and described.

8. In a meat and vegetable slicing machine, the combination, with the reciprocatory knife carrying and operating slide, of a receiver or scoop-form attachment secured thereto adjacent to the exit from the knife and below it, substantially as and for the purpose set forth.

9. In a meat and vegetable slicing machine, the combination, with the receiver C, attached to the slide fixedly on the non-adjustable parts A G, below the exit from the knife T, of the chute $A^2$, attached to the gage-board A', to deliver the sliced product in said receiver, substantially as and for the purpose set forth.

10. In a slicing-machine, substantially as described, having gage-board A', supported on parallel guiding-standards $T^3$, the combination, with a pair of the latter arranged oppositely on the stringers G or frame of the slide, of the plate or casing J', fixedly attached to the gage-board A', and embracing said standards by eyes K' $K^4$ in extensions of said plate, the locking-bars N N', also embracing said standards by the eyes R R' in their outer ends, and having their inner ends arranged to pass each other in recess J under said plate and present the lugs $R^2$ $R^3$ thereon out through said plate, and the locking-cam P, having eccentric faces M M' pivoted on said plate and adapted to engage said lugs on said bars, substantially as and for the purposes set forth.

11. For adjustably securing by opposite purchase a part, A', in a fixed frame, A G, the opposite fixed standards, $T^3$, in combination with the gripping mechanism composed of case J' and locking-bars N N', having their outer ends sleeved on said standards loosely and kept applied to each other by the attaching-screws of said case, and the locking-cam P, having eccentric faces M M' pivoted to said case and adapted to actuate said bars by contact with projections thereon, for tightening the grip of said sleeved parts on said standards, substantially as set forth.

JOHN W. ANDERSON.

Witnesses:
JEREMIAH RIFE,
MARTIN B. RIFE.